United States Patent

Gondeck

[15] 3,679,881

[45] July 25, 1972

[54] DIGITAL SINE WAVE GENERATOR AND METHOD

[72] Inventor: Allan R. Gondeck, Gainsville, Fla.

[73] Assignee: Western Electric Company, Incorporated, New York, N.Y.

[22] Filed: June 19, 1970

[21] Appl. No.: 47,726

[52] U.S. Cl. ..........235/152, 235/186

[51] Int. Cl. ..........G06f 7/38

[58] Field of Search ..........235/152, 197, 150.53; 328/14, 328/187

[56] References Cited

UNITED STATES PATENTS

| | | | |
|---|---|---|---|
| 3,109,092 | 10/1963 | Lott et al. | 235/164 |
| 2,995,302 | 8/1961 | Ingwerson et al. | 235/152 |
| 3,435,196 | 3/1969 | Schmid | 235/197 |
| 3,473,011 | 10/1969 | Schmid | 235/197 |

*Primary Examiner*—Eugene G. Botz
*Assistant Examiner*—David H. Malzahn
*Attorney*—W. M. Kain, R. P. Miller and B. I. Levine

[57] ABSTRACT

A digital sine wave generator utilizes a closed loop according to the formula:

$$\sin\theta = -\int\int \sin\theta d\theta d\theta$$

Initially, a first register is set with O and a second register is set with 1 therein. Incrementally, the sum in the second register is multiplied by a number between zero and one and added to the sum in the first register and the sum in the first register is multiplied by a number between zero and one and subtracted from the sum in the second register. A counter may be provided to count the increments and reset the first and second registers when the count indicates a full cycle. Subtraction is made by adding to the inverse of the second register. The generator may be employed to test the phase shift of a unit under test by reading the counter when the output of the unit under test crosses zero.

5 Claims, 7 Drawing Figures

INVENTOR
A. R. GONDECK
BY D. W. Marks
ATTORNEY $$S(n+1) = S(n) + 2^{-2} C(n)$$
$$\overline{C(n+1)} = \overline{C(n)} + 2^{-2} S(n+1)$$
$$\overline{C(n)} = \text{INVERSE } C(n)$$

| | n | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|---|
| S(n) | 17a | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 0 |
| | 17b | 0 | 0 | 0 | 0 | 0 | 0 | 1 | 1 | 0 | 0 | 0 | 0 | 0 | 0 | 1 | 1 | 1 | 1 | 1 | 1 | 1 | 1 | 1 | 1 | 1 | 0 |
| | 17c | 0 | 0 | 0 | 1 | 1 | 1 | 0 | 0 | 1 | 1 | 1 | 1 | 0 | 0 | 1 | 1 | 0 | 0 | 0 | 0 | 0 | 0 | 0 | 1 | 1 | 0 |
| | 17d | 0 | 1 | 1 | 0 | 1 | 1 | 0 | 0 | 1 | 1 | 0 | 0 | 1 | 0 | 1 | 0 | 1 | 1 | 1 | 0 | 0 | 1 | 1 | 0 | 1 | 0 |
| | 17e | 0 | 0 | 1 | 1 | 0 | 1 | 0 | 0 | 1 | 0 | 1 | 0 | 0 | 0 | 0 | 1 | 1 | 0 | 0 | 1 | 1 | 0 | 1 | 0 | 0 | 0 |
| | 17f | 0 | 0 | 1 | 0 | 1 | 1 | 0 | 0 | 1 | 1 | 1 | 0 | 1 | 1 | 1 | 0 | 1 | 1 | 0 | 1 | 1 | 0 | 0 | 1 | 0 | 0 |
| | | | | | | | | | | | | | | | | | | | | | | | | | | | |
| $\overline{C(n)}$ | 18a | 1 | 1 | 1 | 1 | 1 | 1 | 1 | 0 | 0 | 0 | 0 | 0 | 0 | 0 | 0 | 0 | 0 | 0 | 0 | 1 | 1 | 1 | 1 | 1 | 1 | 1 |
| | 18b | 0 | 1 | 1 | 1 | 1 | 1 | 1 | 0 | 0 | 0 | 0 | 0 | 0 | 0 | 0 | 0 | 0 | 0 | 0 | 1 | 1 | 1 | 1 | 1 | 0 | 0 |
| | 18c | 1 | 0 | 0 | 0 | 0 | 1 | 1 | 0 | 0 | 0 | 1 | 1 | 1 | 1 | 1 | 1 | 0 | 0 | 0 | 1 | 1 | 0 | 0 | 0 | 1 | 1 |
| | 18d | 1 | 0 | 0 | 0 | 1 | 0 | 1 | 0 | 1 | 1 | 0 | 0 | 1 | 1 | 0 | 0 | 1 | 0 | 0 | 1 | 0 | 1 | 0 | 0 | 1 | 1 |
| | 18e | 1 | 0 | 0 | 1 | 1 | 0 | 0 | 0 | 0 | 1 | 0 | 1 | 0 | 0 | 1 | 0 | 1 | 1 | 0 | 0 | 0 | 0 | 1 | 0 | 1 | 1 |
| | 18f | 1 | 0 | 1 | 1 | 0 | 1 | 1 | 1 | 0 | 1 | 1 | 1 | 0 | 0 | 1 | 1 | 0 | 1 | 0 | 0 | 0 | 1 | 0 | 0 | 1 | 1 |
| | | | | | | | | | | | | | | | | | | | | | | | | | | | |
| S(n)+1 | 51 | 0 | 0 | 0 | 0 | 0 | 0 | 1 | 1 | 0 | 0 | 0 | 0 | 0 | 0 | 0 | 0 | 0 | 0 | 0 | 0 | 0 | 0 | 0 | 0 | 0 | 0 |
| | 52 | 1 | 1 | 1 | 1 | 1 | 1 | 0 | 0 | 1 | 1 | 1 | 1 | 1 | 1 | 0 | 0 | 0 | 0 | 0 | 0 | 0 | 0 | 0 | 0 | 0 | 1 |
| | 53 | 0 | 0 | 0 | 1 | 1 | 1 | 1 | 1 | 1 | 1 | 1 | 1 | 0 | 0 | 1 | 1 | 0 | 0 | 0 | 0 | 0 | 0 | 0 | 1 | 1 | 0 |
| | 54 | 0 | 1 | 1 | 0 | 1 | 1 | 1 | 1 | 1 | 1 | 0 | 0 | 1 | 0 | 1 | 0 | 1 | 1 | 1 | 0 | 0 | 1 | 1 | 0 | 1 | 0 |
| | 55 | 0 | 0 | 1 | 1 | 0 | 1 | 1 | 1 | 1 | 0 | 1 | 0 | 0 | 0 | 0 | 1 | 1 | 0 | 0 | 1 | 1 | 0 | 1 | 0 | 0 | 0 |
| | 56 | 0 | 0 | 1 | 0 | 1 | 1 | 1 | 1 | 1 | 1 | 1 | 0 | 1 | 0 | 1 | 0 | 1 | 1 | 0 | 1 | 1 | 0 | 0 | 1 | 0 | 0 |

FIG-7

DIGITAL SINE WAVE GENERATOR AND METHOD

BACKGROUND OF THE INVENTION

1. Field of the Invention

This invention relates to very low frequency digital sine wave generators. Such generators may be used in testing electrical apparatus and equipment for malfunctions or phase shift or for generating low frequencies for a variety of uses. An embodiment of this invention is capable of generating sine waves of up to 200 Hz and down to cycles of almost infinite length.

2. Description of the Prior Art

Electric oscillators or dynamos are generally incapable of generating frequencies below ten Hertz and particularly less than one Hertz. The prior art also describes sine wave synthesizers wherein a plurality of stepped voltages are sequentially connected to an output by switching facilities.

SUMMARY OF THE INVENTION

An object of the present invention is a new and improved method of and apparatus for producing low frequency signals.

Another object of the invention is a new and improved method and apparatus utilizing the formula $\sin\theta = -\iint \sin\theta\, d\theta d\theta$ for generating a low frequency signal.

A further object of the invention is a method of and apparatus for generating low frequency signals employing rectangular binary approximate integration techniques.

In accordance with these and other objects, an embodiment of the invention employs a first register which is initially set to zero and a second register which is set to one. Incrementally, the sum of the second register is multiplied by a number between zero and one and added to the sum in the first register while the sum in the first register is multiplied by a number between zero and one and subtracted from the sum in the second register.

BRIEF DESCRIPTION OF THE DRAWING

FIGS. 5 and 6 show an embodiment of a sine wave generator described in more detail than shown in FIG. 3. By placing the sheet on which FIG. 6 is located to the right of the sheet on which FIG. 5 is located, the total circuit of this embodiment of the sine wave generator may be viewed.

FIG. 7 shows a table of the output of the various stages of the apparatus shown in FIGS. 5 and 6.

DETAILED DESCRIPTION

Figure 1:
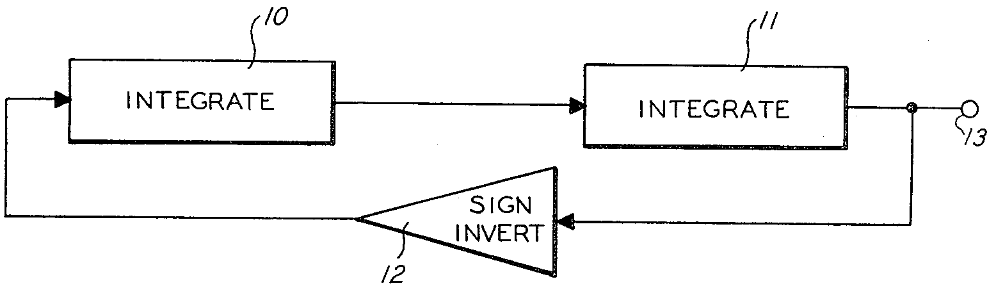
FIG. 1 is an algorithm presentation showing the principles of operation of the generator.

Referring first to FIG. 1, there is shown an algorithm presentation showing integrate steps 10 and 11 and a sign inverting step 12 for producing a sine wave signal on an output 13 in accordance with the formula: $\sin\theta = -\iint \sin\theta\, d\theta d\theta$. The inverter 12 changes the sign of the output signal and the integrators 10 and 11 integrate the signal twice to produce the sine wave on the output.

Figure 2:
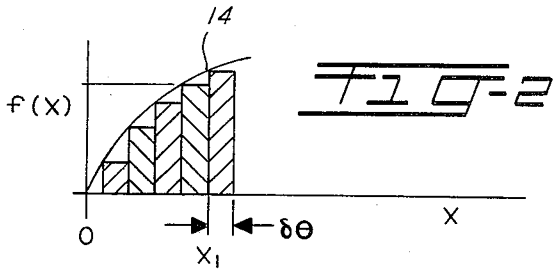
FIG. 2 is a waveform illustrating rectangular approximate integration.

Referring to FIG. 2, integration may be performed or approximated by summing rectangles approximating or the area beneath a curve of the function $f(x)$ such as the curve 14. The width of each rectangle is $\delta\theta$ while the height is the value of the function or curve at the rectangle. The approximate value of the integral of $f(x)$ from 0 to X, is the sum of all rectangles from 0 to X.

Figure 3:
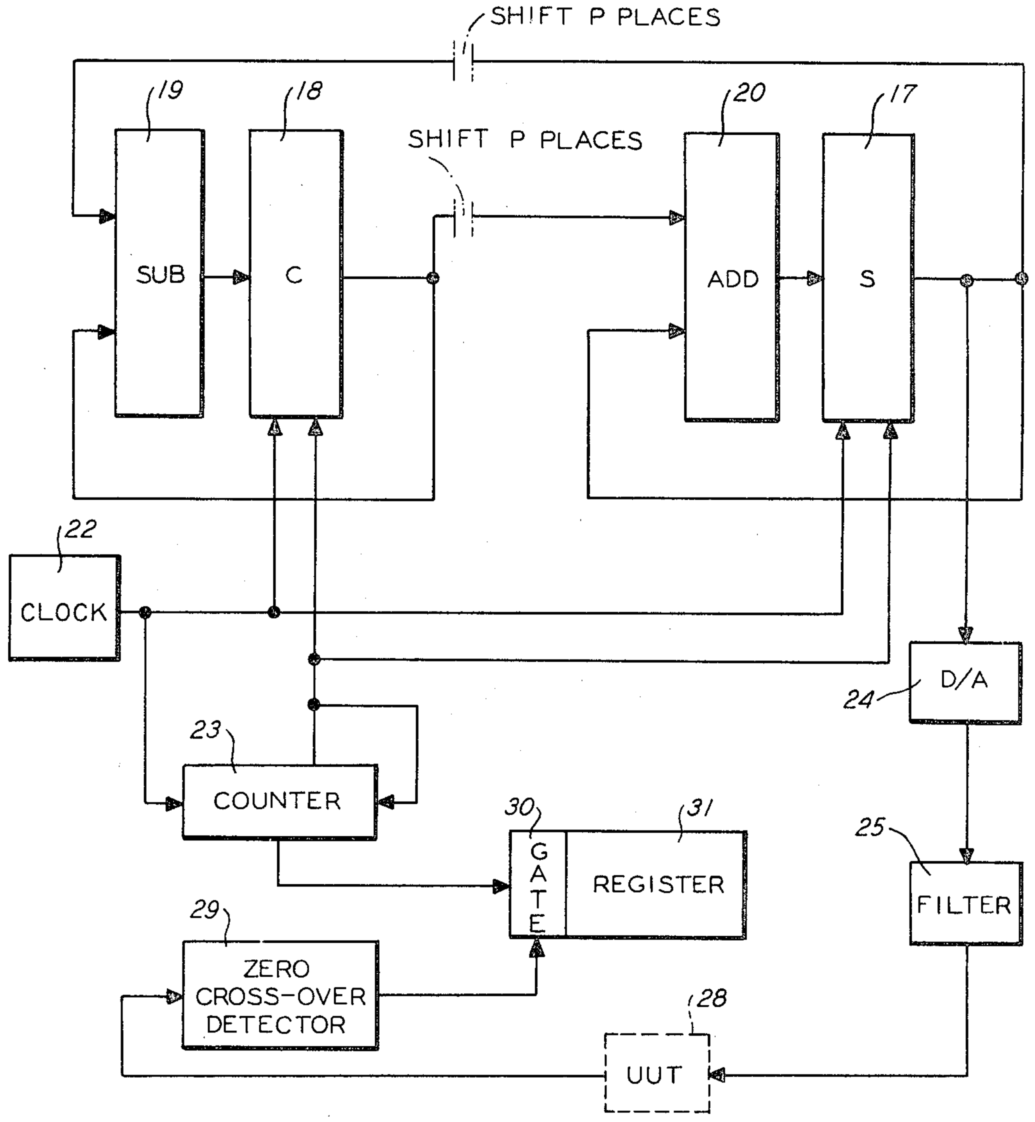
FIG. 3 is a diagram of an apparatus employing the principles of the invention.

Referring now to FIG. 3, there is shown a digital apparatus for performing the algorithm shown in FIG. 1 using approximate integration by rectangular summation. A first register 17 is initially set to zero to correspond to the value $S(o)$ of the sine at zero increment. A second register 18 is set to one to correspond to the value $C(o)$ of the cosine at zero increment. The output $S(n)$ of the register 17 is multiplied by an increment $\delta\theta$ by shifting the contents of the register P places to produce a product $\delta\theta\cdot S(n)$. With the register 17 a binary register, $\delta\theta = 2^{-P}$. A subtraction circuit 19 subtracts the product $\delta\theta\cdot S(n)$ from the number $C(n)$ in the second register 18 to produce a remainder $C(n+1)$ in the second register 18. Similarly, the output $C(n)$ of the second register 18 is multiplied by $\delta\theta$ by shifting P places to produce a product $\delta\theta\cdot C(n)$. The product $\delta\,\theta\cdot C(n)$ is then added by an add circuit 20 to the number in the first register 17 to produce a sum $S(n+1)$.

A clock or pulse generator 22 produces a pulse signal which sets the registers 17 and 18 to correspond to the outputs of the add circuit 20 and subtract circuit 19, respectively. Each step of the clock 22 is counted by a counter 23. After the counter 23 has indicated that sufficient steps have been made to correspond to 360° or one full cycle, the counter applies an output to the registers 17 and 18 to reset the register 17 with the zero output and the register 18 with the one output. This reset step may be necessary since error in the approximate integration may make the values in the registers 17 and 18 at 360° other than zero and one, respectively.

The output of the register 17 is applied to a digital to analog converter 24 which converts the digital output of the register 17 to an analog signal. The output of the digital to analog converter 24 may then be filtered by a filter 25 to remove higher frequency components to produce a single frequency sine wave.

One use of the sine wave generator is to test a unit 28 for phase shift. The sine wave from the filter 25 is applied to the input of the unit 28 under test. The output of the unit under test is connected to a zero-cross-over-detector 29. When the output of the unit under test 28 crosses over zero from negative to positive, the zero-cross-over-detector produces a pulse which operates a gate 30 to read the count of the counter 23 in a register 31. Thus, the register 31 directly reads in increments the phase shift between the input and the output of the unit under test 28. Of course other circuitry may be associated with the register 31 to convert the reading from increments to degrees or radians.

Figure 4:
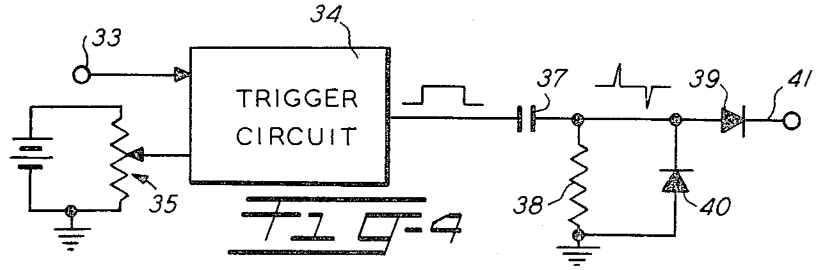
FIG. 4 is a circuit of a zero cross over detector shown in FIG. 3.

One suitable zero-cross-over-detector 29 is shown in FIG. 4. The input 33 is connected to a trigger circuit 34, such as a Schmitt trigger, which has a triggering level set by a bias source 35. The bias source 35 is set so that the trigger circuit 34 is operated or energized when the input becomes greater than zero to produce an output signal or a square wave pulse during the positive portion of the sine wave input. The output of the trigger circuit 34 is then applied to a differentiating circuit comprising a capacitor 37 and a resistor 38 to produce a positive spike and negative spike from the square wave output of the trigger circuit 34. The positive spike is passed by a diode 39 to the output 51 while the negative spike is shorted to ground by a diode 40. The positive pulse on output 41 is then used to operate the gate circuit 30 to produce a reading in the register 31 of the phase shift of the unit under test 28.

Figure 6:
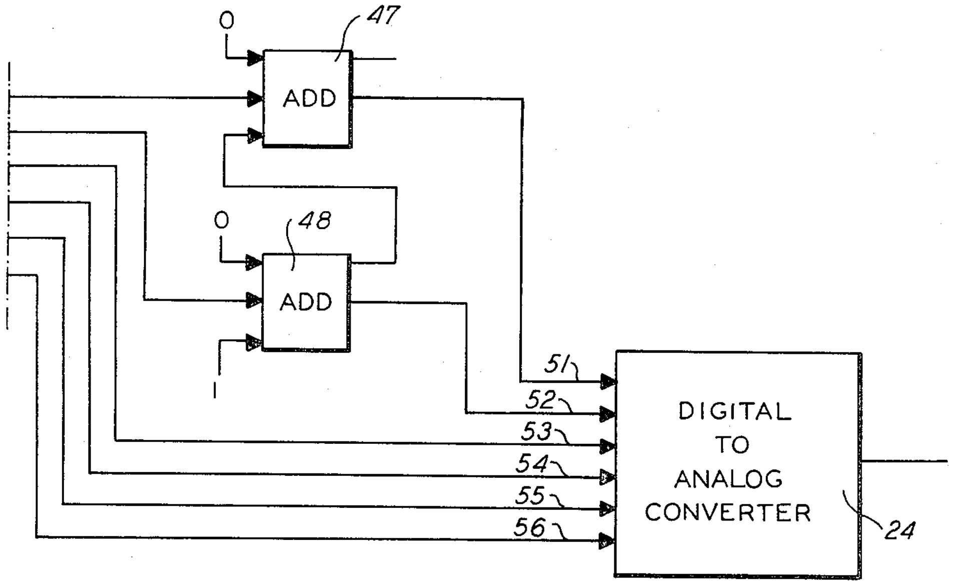
Figure 5:
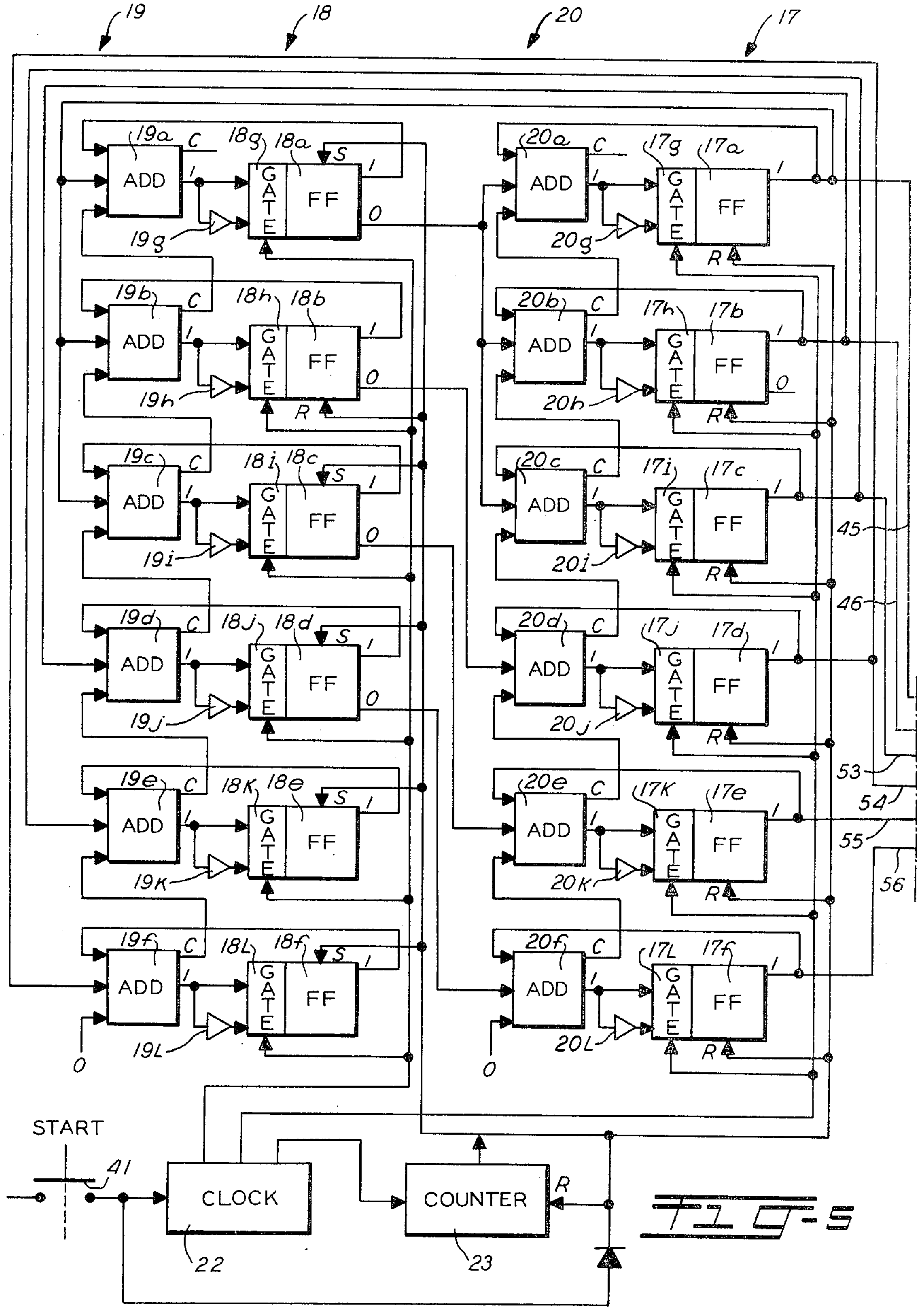

Referring now to FIGS. 5 and 6, there is shown one way of implementing the registers 17 and 18, the subtract circuit 19 and the add circuit 20. The register 17 contains flip-flops 17*a*–17*f* which have inputs controlled by gate circuits 17*g*–17*l*. The register 17 produces the value $S(n)$ of the sine wave on the 1 outputs of the flip-flops 17*b*–17*f*. The 1 output of the flip-flop 17*a* corresponds to the sign of the number in the flip-flops 17*b*–17*f* with 0 being positive and 1 being negative. The register 18 contains the flip-flops 18*a*–18*f* which have inputs controlled by gate circuits 18*g*–18*l*. Subtraction is accomplished by adding to the inverse of the cosine value $\overline{C(n)}$. Accordingly, the 1 outputs of the flip-flops 18*b*–18*f* produce the inverse value $\overline{C(n)}$ of the cosine while the 0 outputs of the flip-flops 18*b*–18*f* produce the value $C(n)$ of the cosine. The 1 output of the flip-flop 18*a* indicates the inverse of the sign of the cosine value while the 0 input of the flip-flop 18*a* indicates the sign of the cosine value with 0 being positive and 1 being negative. The add circuit 20 contains full adders 20*a*–20*f* and the inverter circuits 20g–20l. The subtract circuit 19 contains the full adders 19 a–19f and the inverter circuits 19g–19l. The flip-flops, gate circuits, and add circuits may be any conventional circuits which perform the various functions. The circuits can be multiple integrated circuits in a single unit so that many add circuits or gated flip-flops may be employed. Also, the add circuits may contain the inverted output and thus the inverter circuits 19g–19l and 20g–20l could be eliminated.

The 1 outputs of each of the flip-flops 17a–17f are connected to respective inputs of the add circuits 20a–20f. Also, the 1 outputs of each of the flip-flops 18a–18f are connected to respective inputs of the add circuits 19a–19f. The add circuits 19a–19e and 20a–20e have inputs connected to carry outputs from the respective lower order add circuits 19b–19f and 20b–20f. ADD circuits 20d, 20e, and 20f hAve inputs connected to the 0 outputs of the respective flip-flops 18b, 18c and 18d to shift the cosine value C(n) in the register 18 two places to multiply the cosine value by $2^{-2}$. Similarly, the 1 outputs of the flip-flops 17b, 17c and 17d are shifted two places and connected to the inputs of ADD circuits 19d, 19e and 19f, respectively, to multiply the sin value S(n) by $2^{-2}$. Negative numbers on the 1 outputs of flip-flops 17b–17f and on the 0 outputs of flip-flops 18b–18f are expressed as 2's complement. In order to preserve the complementary status of a negative number when it is shifted or multiplied by $2^{-2}$, the 0 output of the flip-flop 18a is connected to inputs of the ADD circuits 20a, 20b and 20c and the 1 and of the flip-flop 17a is connected to inputs of the ADD circuits 19a, 19b and 19c.

The clock circuit 22 controls the gate circuits 17g–17l and 18g–18 to incrementally change the status of the flip-flops 17a–17 and 18a–18f to correspond to the outputs of the respective ADD circuits 20a–20f and 19a–19f. When the count in the counter 23 reaches a number corresponding to a full cycle, the counter 23 resets the flip-flops 17a–17f to 00.0,000 and the flip-flops 18a–18f to 10.1,111.

The 1 outputs of the flip-flops 17a and 17b are connected by lines 45 and 46 to respective inputs of ADD circuits 47 and 48 in FIG. 6. A 1 is applied to a second input of the ADD circuit 48. The outputs of the ADD circuits 47 and 48 on lines 51 and 52 and the 1 outputs of the flip-flops 17c–17f on lines 53–56 are applied to respective inputs of the digital-to-analog converter 24. The ADD circuits 47 and 48 add a 1 to the output of the register 17 so that it will always be expressed as a positive number and the complementary form is eliminated. The bias source 35 in FIG. 4 can be set to account for the 1 in the analog output.

If the value of the sine wave never reached 01.0,000 in the flip-flops 17a–17f, the line 46 could be connected to the 0 output of the flip-flop 17b with the lines 45 and 46 connected directly to lines 51 and 52 to the digital-to-analog converter 24 to add a 1 to the sum in the register 17. Thus, the ADD circuits 47 and 48 could be eliminated.

The sine wave generator may be operated in three sequences: (1) the gate circuits 17g–17l and 18g–18l can be operated simultaneously such that the delay through the ADD circuits 19a–19f and 20a–20f insures that the registers 17 and 18 are stepped only one increment; (2) the gates 18g–18l may be operated first and then the gates 17g–17l may be operated second; and (3) the gates 17g–17l may be operated first and then the gates 18g–18l operated second. The first sequence with registers 17 and 18 operating simultaneously produces the following values:

$$C(n+1) = C(n) - 2^{-2}S(n)$$

$$S(n+1) = S(n) + 2^{-2}C(n)$$

The second sequence with register 18 stepped first produces the following values:

$$C(n+1) = C(n) - 2^{-2}S(n)$$

$$S(n+1) = S(n) + 2^{-2}C(n+1)$$

The third sequence with the register 17 stepped first produces the following values:

$$C(n+1) = C(n) - 2^{-2}S(n+1)$$

$$S(n+1) = S(n) + 2^{-2}C(n)$$

C(n) is the cosine value on the nth increment while S(n) is the sine value on the nth increment.

The accuracy of the sine wave produced is different for the three sequences. FIG. 7 shows the sine wave values S(n), inverse cosine values $\overline{C(n)}$, and the input of the digital-to-analog converter 24 for the third sequence where:

$$C(n+1) = C(n) - 2^{-2}S(n+1) \text{ and}$$

$$S(n+1) = S(n) + 2^{118\ 2}C(n).$$

Also, the accuracy of the sine wave value may be improved by additional stages in the registers 17 and 18 and the multiplication by smaller increments. For example, less than $2 \times 10^{-4}$ error occurs in a 24 bit register where the multiplier is $2^{-10}$ and the third sequence is used.

A start switch 41 is used initially (1) to set the clock circuit 22 at the beginning of a cycle, (2) to reset the counter 23 to 0 count, (3) to set the register 17 to read 00.0,000 and (4) to set the register 18 to read 10.1,111 on the 1 outputs of the flip-flops 18a–18f.

The above-described embodiments are simply illustrative of the principles of the invention and many embodiments may be devised without departing from the scope and spirit of the invention. For example, there is herein described a specially constructed circuit for producing the approximate sine wave but some general purpose computers could readily be programmed to accomplish the same result according to the principles of the invention.

What is claimed is:

1. A method of generating an approximate sine wave comprising:

- initially setting a first binary register to produce an output number which is 0 and initially setting a second binary register to produce an output number which is the inverse of 1; and thereafter generating a stepped sine wave wherein each increment is made by the following steps;
- shifting the output number of the first binary register P places to a lesser significant number to multiply the output number of the first binary register by $2^{-P}$ to produce a first product;
- shifting the inverse of the output number of the second binary register P places to a lesser significant number to multiply the inverse of the output number of the second binary register by $2^{-P}$ to produce a second product;
- adding 1's to the first P digits of the first product if the sign of the output number in the first binary register is negative to produce a first sum;
- adding 1's to the first P digits of the second product if the sign of the inverse of the output number in the secondary binary register is negative to produce a second sum;
- adding the first sum to the output number in the second register; and
- adding the second sum to the output number in the first register, the sequence of the set of steps of shifting the output number of the first binary register, adding 1's to the first P digits of the first product and adding the first sum to the output number in the second register may be performed before, at the same time or after the sequence of the set of steps of shifting the inverse of the output number of the second binary register, adding 1's to the first P digits of the second product and adding the second sum to the output number in the first register.

2. A method as defined in claim 1, wherein during each increment the first sum is added to the number in the second register at the same time as the second sum is added to the number in the first register.

3. A method as defined in claim 1, wherein during each increment the first sum is added to the number in the second register prior to adding the second sum to the number in the first register.

4. A method as defined in claim 1, wherein during each increment the second sum is added to the number in the first register prior to adding the first sum to the number in the second register.

5. A digital sine wave generator comprising:

first and second binary registers, each having a plurality of stages;

means for initially setting the first register to produce an output number which is 0 and for initially setting the second register to produce an output number which is the inverse of 1;

means for shifting the output number of the first binary register P places to a lesser significant number to multiply the output number of the first binary register by $2^{-P}$ to produce a first product;

means for shifting the inverse of the output number of the second binary register P places to a lesser significant number to multiply the inverse of the output number of the second binary register by $2^{-P}$ to produce a second product;

means for adding the first product to the number in the second register;

means for adding the second product to the number in the first register;

means for adding 1's to the digits of the first P most significant stages of the second register if the number in the first register is negative; and means for adding 1's to the digits of the first P most significant stages of the first register if the sign of the inverse of the number in the second register is negative.

* * * * *